A. KINGSBURY.
METHOD AND MEANS FOR TESTING GEARING.
APPLICATION FILED JULY 23, 1910.
1,198,637.
Patented Sept. 19, 1916.
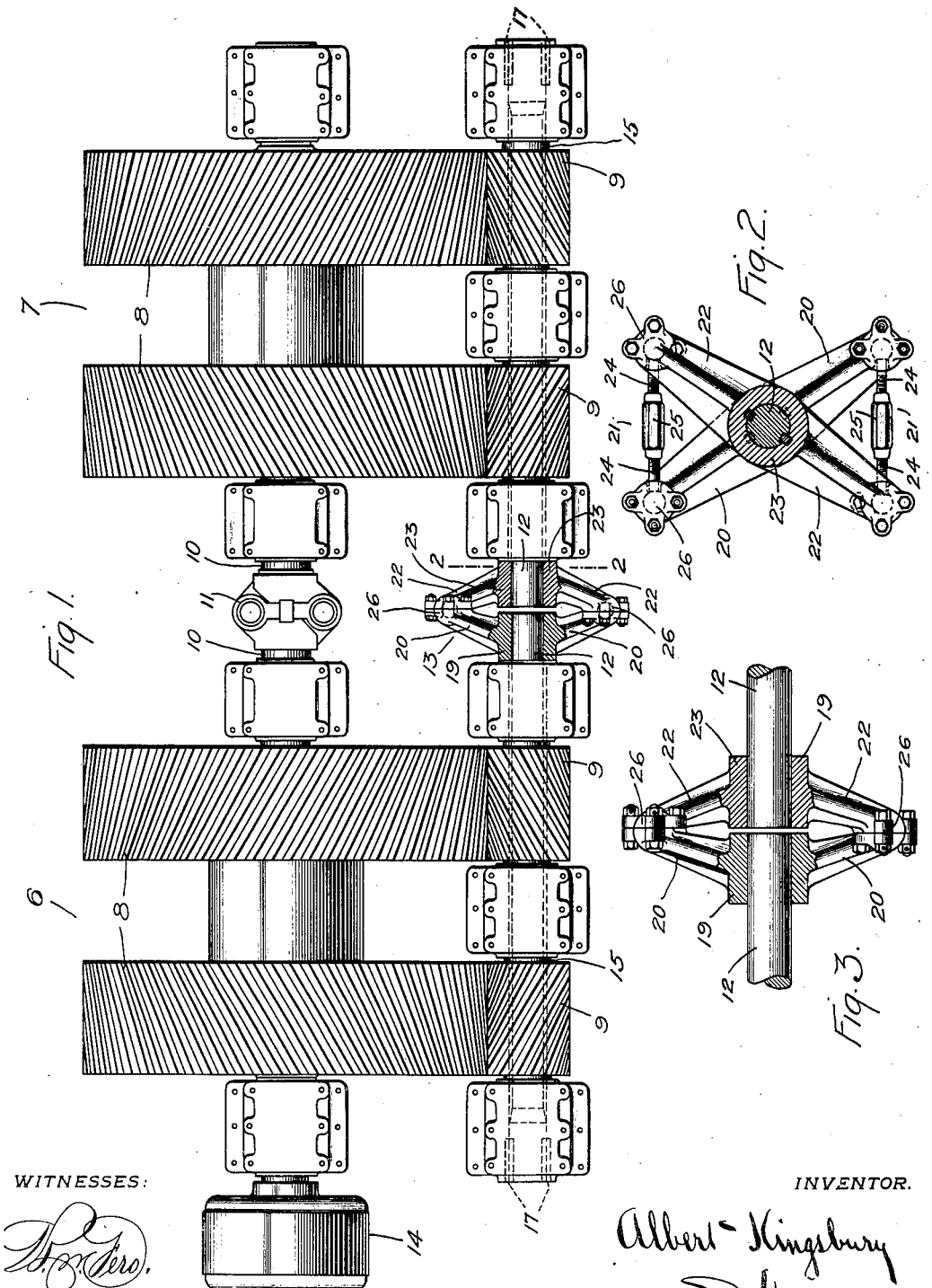
WITNESSES:
INVENTOR.
Albert Kingsbury
BY
HIS ATTORNEY IN FACT.

UNITED STATES PATENT OFFICE.

ALBERT KINGSBURY, OF PITTSBURGH, PENNSYLVANIA, ASSIGNOR, BY MESNE ASSIGNMENTS, TO THE WESTINGHOUSE GEAR AND DYNAMOMETER COMPANY, A CORPORATION OF PENNSYLVANIA.

METHOD AND MEANS FOR TESTING GEARING.

1,198,637.  Specification of Letters Patent.  Patented Sept. 19, 1916.

Application filed July 23, 1910. Serial No. 573,411.

*To all whom it may concern:*

Be it known that I, ALBERT KINGSBURY, a citizen of the United States, and a resident of Pittsburgh, in the county of Allegheny and State of Pennsylvania, have made a new and useful Invention in Methods and Means for Testing Gearing, of which the following is a specification.

This invention has for an object to produce new and improved means and a new and improved method for testing gears.

It is incumbent on the manufacturers of large reduction gears to thoroughly test them before they are installed with the apparatus with which they are to be employed. The only adequate method of testing gears is to subject them as nearly as possible to the operating conditions and after a comparatively long run to note the effect on the gears and the wear on the teeth of the gears. Inasmuch as the defects in such gears may not be disclosed until after a long and thorough test, it is frequently a very expensive operation to test large gears. It will be apparent that the expense of testing gears adapted to be employed in marine propulsion, for example is almost prohibitive, if the ordinary methods of testing are employed. Such gears are often adapted to transmit from two thousand to six thousand horse power and to test them, under operating conditions, for weeks or months would occasion an expenditure, amounting to thousands of dollars. In order to make the test conclusive, the gear as has been said must be fully loaded, and consequently, the expense of developing power enough to drive the gears under load is just as great as if the gears were installed in a vessel running under ordinary operating conditions. Inasmuch as the only forces which ordinarily affect the operation or the life of a gear are the tooth pressures, it is sufficient in testing a gear or set of gears if the tooth pressures encountered by the gear or the gears correspond to the pressures encountered under ordinary operating conditions.

An object of my invention is to produce a method of testing gears in which the gears are subjected to the tooth pressures encountered while operating under load and in which the only power required to drive the gears during a test is the power necessary to overcome the friction of the gears while running at the various speeds, and under the various tooth pressures.

A further object of my invention is to produce means for causing the tooth pressures between the gears to correspond to the tooth pressures encountered during full loads without the necessity of fully loading the gears.

These and other objects I attain by means of the apparatus illustrated in the drawings accompanying this application and forming a part thereof.

In the drawings: Figure 1 is a plan view showing two sets of gearing arranged to be tested in accordance with my invention, and equipped with a torque imposing device which is shown partially in section; Fig. 2 is a sectional view along the line 2—2 of Fig. 1 and discloses an embodiment of a torque imposing device which forms a detail of my invention; and Fig. 3 is an elevation of the device shown in Fig. 2, a portion being shown in section for the sake of illustration.

In carrying out my invention I preferably test two gears at the same time. In the arrangement illustrated I have employed two sets of gearing 6 and 7 each of which is adapted to be employed in marine propulsion, and to transmit power directly from the shaft of a turbine to the propeller shaft of a vessel. Each set of gearing consists of a pair of gears 8 and a pair of pinions 9 meshing with the respective gears.

In carrying out my invention, to wit, my improved method of testing gears, I preferably directly connect the shafts 10 of the gears 8 of each set by means of any suitable shaft coupling 11, and I also directly connect the shafts 12 of the pinions of the two sets of gearing to be tested by means of a torque imposing device or coupling 13 which will be hereinafter more fully described. I preferably drive the two sets of gearing so connected by a motor, turbine or other engine 14 which may be coupled or otherwise connected to the shaft 10 of either of the sets of gearings 6 and 7.

The disclosed arrangement of coupling the gearing is not absolutely essential since the shafts 10 of the gears 8 of the two sets may be, and under some conditions are preferably connected by the torque imposing coupling 13. Under such conditions, the shafts 12 of the pinions of the two sets will be directly connected by a suitable coupling such as the coupling 11. In addition to this, the driving motor or engine 14 may be connected to the shaft of either pinion if desired.

The two sets of gearing illustrated are provided with a special arrangement of shafting for the pinions 9. The two pinions 9 of each gearing are integrally formed or are mounted on a tubular member 15 and the shaft 12 of each pair of pinions is rigidly secured to one end of the member 15 by any suitable means, as for example keys 17, and the shaft extends through the hollow interior of the member 15 and its free end projects beyond the member. Under operating conditions the projecting ends of the shafts 12 are adapted to be secured to a driving turbine or any other prime mover. In the present arrangement, the projecting ends of the shafts 12 of the two sets of gearing are connected together by means of the torque imposing device 13 as has been said. The device or coupling 13 illustrated includes a hub or collar 19 adapted to be mounted on the shaft 12 of the gearing 6 and provided with integrally formed extending arms 20 which are connected by means of adjustable links 21 to corresponding extending arms 22 provided on a hub or collar 23 which is adapted to be mounted on the shaft 12 of the set of gearing 7. Each link 21 consists of two threaded bars 24 connected together by a sleeve nut 25; and each bar 24 may be secured to its supporting arm of the device 13 by a ball and socket joint 26. With this arrangement, the gears and the pinions of the two sets of gearing are respectively connected together and variable tooth pressures may be imposed upon the gears of both sets in either direction by rotating or tending to rotate shaft 12 of one gearing relative to the shaft 12 of the other gearing. When it is desired to create or impose a tooth pressure in one direction on the gearing 6 the sleeve nuts 25 are turned so as to increase the divergency of the arms 20 and 22 of the device 13. This causes the pinions of one gearing to tend to drive their intermeshing gears 8 in one direction, while the pinions of the other set of gearing will tend to drive their intermeshing gears in the opposite direction. These opposing tendencies operate to counteract each other, since the gears 8 of each set of gearing are directly connected by the coupling 11 and the only effect of the opposing forces will be to create or impose a tooth pressure on the intermeshing gears of each gearing which will be maintained as the gears are driven at any speed. In order to subject the gearing to tooth pressures in the opposite direction, the sleeve nuts 25 of the torque imposing device are turned so as to decrease the divergency of the arms 22. It has been found in practice that the shafts 12 of the gearings illustrated yield or twist a definite amount when subjected to certain torsional strains; consequently, the stress or torque imposed upon the shafts 12 by the torque imposing device can be accurately ascertained and gaged by providing means for measuring the amount each shaft is strained or twisted. With such an arrangement, the amount of tooth pressure imposed by the device 13 upon the intermeshing gears can be accurately ascertained, and it can be so adjusted and varied that it may be made to correspond to the tooth pressures encountered while the gears are operating under various loads.

In driving the two sets of gearing, it will be apparent that the gears of each set will be subjected to approximately the same conditions as if operating under full load, and that the amount of power required to drive the gears will be the power necessary to overcome friction of the two sets of gearings. This power, it will be seen, corresponds to the power necessary to overcome the friction of the gearings while operating under various loads.

With the arrangement of gears shown, I am able to determine very accurately the amount of power lost in or absorbed by the gearings during different loads. In determining this, I employ a calibrated electric motor in driving the gearings during the test. This motor may be coupled to the shaft 10 of either of the gearings.

During the operation of the gearings each separate gear and pinion is effective as a driving agent as well as a driven agent; for example, the power delivered to the shaft 10 of the gearing 8 is imparted to the gears 8 of that gearing and also to the gears 8 of the gearing 7; and the power imparted to the pinions 9 by the gears 8 of the gearing 7 is also imparted to the pinions 9 of the set 8. With this arrangement, no one of the gears or pinions is wholly driven by, or wholly drives its intermeshing gear or pinion.

It will be apparent that any type of intermeshing gears may be tested in accordance with my invention and that the set of gears 7 may be replaced by any suitable pair of gears which may be used permanently as a testing set or which may be cast or otherwise formed for testing a special set of gearing.

Having thus described my invention, what I claim is:

1. The method of testing intermeshing gears, which consists in forcing the working faces of the intermeshing teeth of the gears into contact with each other while the gears are at rest so as to impart a tooth pressure in one direction only on each gear which pressure corresponds in intensity to the tooth pressure encountered while the gears are operating under load and is independent of the driving force transmitted to the gears and then in driving said gears while maintaining the tooth pressure so imparted to them.

2. The method of testing intermeshing gears, which consists in exerting a torque on one of the gears so as to force the working faces of the intermeshing teeth into contact with each other and so as to impart a tooth pressure on the gears, such pressure being always in the same direction for the same gear and in opposite directions for the different gears, and then driving said gears by imparting a driving force to the shaft of each gear, while maintaining the tooth pressure on the gears.

3. A method of subjecting intermeshing gears to a load test without transmitting a corresponding load through the gears, which consists in forcing the working faces of the intermeshing teeth of the gears into contact with each other while the gears are at rest so as to impose a tooth pressure in one direction only on each gear which is independent of the driving force transmitted to the gears and which pressure corresponds in intensity to the tooth pressure encountered while operating the gears under load, and then rotating the gears by imparting a driving force to the shaft of each gear, while maintaining the tooth pressure on the gears.

4. Means for testing sets of intermeshing gears, comprising shafts for said gears, means connecting the shafts of the gears and for creating, while the gears are at rest, a tooth pressure in one direction only on each gear, which pressure corresponds in intensity to the pressure encountered while operating the gears under load, and for maintaining said pressure during the rotation of the gears, and means for driving the gears.

5. In a means for testing sets of gears, the combination of shafts, means whereby the shafts may be connected through a train of gears including a set to be tested, and means connecting the shafts independently of the gears for creating, while the gears are at rest, a tooth pressure between them uniform in direction and corresponding in intensity to the pressure encountered while operating the gears under load and for maintaining said pressure during the rotation of the gears.

6. Apparatus for testing sets of intermeshing gears, comprising, shafts for the gears, an auxiliary set of gears, shafts for said auxiliary gears, means for connecting the shaft of one of said auxiliary gears to the shaft of one of the gears of the set to be tested, and a torque imposing device located between the shaft of the other gear of the set to be tested and the shaft of the other auxiliary gear.

7. In combination with a set of gears to be tested, shafts for said gears, an auxiliary gear, means whereby the auxiliary gear is connected to the shaft of one of said gears to be tested, a gear meshing with said auxiliary gear, and means including a torque imposing device for connecting said last mentioned gear and a second gear of the set to be tested.

In testimony whereof, I have hereunto subscribed my name this 22nd day of July, 1910.

ALBERT KINGSBURY.

Witnesses:
C. W. McGhee,
E. W. McCallister.